US009427782B2

(12) United States Patent
Ayres

(10) Patent No.: US 9,427,782 B2
(45) Date of Patent: Aug. 30, 2016

(54) MODULAR BATCH PLANT FOR GRANULAR PRODUCTS

(71) Applicant: Paul Thomas Ayres, Eau Claire, WI (US)

(72) Inventor: Paul Thomas Ayres, Eau Claire, WI (US)

(73) Assignee: Red Flint Group, LLC, Eau Claire, WI (US)

( * ) Notice: Subject to any disclaimer, the term of this patent is extended or adjusted under 35 U.S.C. 154(b) by 0 days.

(21) Appl. No.: 14/543,367

(22) Filed: Nov. 17, 2014

(65) Prior Publication Data

US 2015/0135636 A1 May 21, 2015

Related U.S. Application Data

(60) Provisional application No. 61/905,573, filed on Nov. 18, 2013, provisional application No. 61/954,363, filed on Mar. 17, 2014.

(51) Int. Cl.

*B07B 15/00* (2006.01)
*B07B 13/16* (2006.01)
*B07B 1/00* (2006.01)
*B65G 49/00* (2006.01)

(52) U.S. Cl.

CPC ............... *B07B 15/00* (2013.01); *B07B 1/005* (2013.01); *B07B 13/16* (2013.01); *B65G 49/00* (2013.01); *Y10T 29/49819* (2015.01)

(58) Field of Classification Search

CPC ....... B07B 15/00; B07B 1/005; B07B 13/16; B65G 49/00; Y10T 29/49819

See application file for complete search history.

(56) References Cited

U.S. PATENT DOCUMENTS 3,672,471 A * 6/1972 Badding .................. B66B 9/00 182/141
3,887,038 A * 6/1975 Buschbom ................ B66B 1/34 187/239

(Continued)

FOREIGN PATENT DOCUMENTS

EP 2522616 11/2012

OTHER PUBLICATIONS

Paul Sawyers; Intermodal Shipping Container Small Steel Buildings, Second Edition; Book; 2008; 114 pages, bound cover to back; San Bernardino, CA, USA, Jan. 12, 2016.

(Continued)

*Primary Examiner* — Rodney Mintz
(74) *Attorney, Agent, or Firm* — Reinhart Boerner Van Deuren P.C.

(57) ABSTRACT

A portable processing plant for processing granular material is provided. The portable plant includes a plurality of portable processing modules configured to be stacked vertically to allow for a vertically downward progression of the generally granular material through the portable processing plant. Each portable processing module includes a self-supporting independent frame structure and has at least one processing component affixed to the self-supporting independent frame structure. The self-supporting independent frame structures of the plurality of portable processing modules combine to define a structural skeleton of the portable processing plant. Each self-supporting independent frame structure can be removed from the structural skeleton substantially fully assembled while the at least one processing component carried by the self-supporting. Methods of assembling and disassembling the portable processing plant are also provided.

19 Claims, 12 Drawing Sheets

(56) References Cited

U.S. PATENT DOCUMENTS

| | | | | | |
|---|---|---|---|---|---|
| 3,925,679 | A * | 12/1975 | Berman | E04B 1/3483 | 290/1 R |
| 4,491,279 | A * | 1/1985 | Long | B02C 21/02 | 241/101.75 |
| 4,854,094 | A | 8/1989 | Clark | | |
| 4,865,158 | A * | 9/1989 | Checkly | A01D 87/122 | 187/239 |
| 5,098,557 | A * | 3/1992 | Hirschler | B07B 9/00 | 209/240 |
| 5,362,193 | A | 11/1994 | Milstead | | |
| 5,634,716 | A | 6/1997 | Westall et al. | | |
| 6,540,089 | B2 * | 4/2003 | Brock | B01F 5/247 | 209/234 |
| 6,820,749 | B2 * | 11/2004 | Brock | B01F 5/247 | 209/238 |
| 8,097,451 | B2 * | 1/2012 | Gaalswyk | C12M 21/12 | 202/83 |
| 8,778,668 | B1 * | 7/2014 | Gaalswyk | C12M 23/58 | 202/83 |
| 8,915,376 | B2 * | 12/2014 | Garland | B07B 11/06 | 209/257 |
| 8,931,217 | B2 * | 1/2015 | Haney | E04H 5/02 | 52/143 |
| 9,296,572 | B2 * | 3/2016 | Houghton | B65G 69/186 | 193/2 D |
| 2002/0148760 | A1 | 10/2002 | Don Brock et al. | | |
| 2003/0116477 | A1 * | 6/2003 | Brock | B01F 5/247 | 209/234 |
| 2006/0192041 | A1 * | 8/2006 | Affleck | A01C 15/003 | 241/34 |
| 2009/0282747 | A1 * | 11/2009 | Epp | A01F 25/163 | 52/20 |
| 2013/0074354 | A1 | 3/2013 | Brownmiller | | |
| 2014/0215731 | A1 * | 8/2014 | Hill | B07B 1/24 | 15/3 |
| 2015/0143775 | A1 * | 5/2015 | Haney | E04H 5/02 | 52/745.02 |
| 2015/0284183 | A1 * | 10/2015 | Houghton | B65G 69/186 | 193/2 D |
| 2015/0354201 | A1 * | 12/2015 | Gruetering | E04H 5/02 | 52/79.1 |

OTHER PUBLICATIONS

Paul Sawyers; Expanded Discussion of the Method for Converting Shipping Containers into a Habitable Steel Building; Book; 2008, 77 pages, bound cover to back; San Bernardino, CA, USA, Jan. 11, 2016.

* cited by examiner

MODULAR BATCH PLANT FOR GRANULAR PRODUCTS

CROSS-REFERENCE TO RELATED PATENT APPLICATIONS

This patent application claims the benefit of U.S. Provisional Patent Application No. 61/905,573, filed Nov. 18, 2013 and U.S. Provisional Patent Application No. 61/954,363, filed Mar. 17, 2014, the entire teachings and disclosure of which are incorporated herein by reference thereto.

FIELD OF THE INVENTION

This invention generally relates to processing plants for processing granular product based on one or more characteristics of the processed product and the desired product.

BACKGROUND OF THE INVENTION

Processing plants for processing granular material are used in many fields. In some instances, the processing plants may be fixed installations or portable installations.

In some processing plants, the processing plant may include processing equipment used to separate a granular material into different grades of material based on a characteristic of the product, such as size as well as to remove impurities. For instance, a processing plant may be used to sort and separate sand into different size sand particles. Similarly, a processing plant may be used to separate seeds, such as seed corn or seed beans, into different size, while removing impurities such as weed seeds (i.e. seeds for undesired plant species) or waste material (e.g. remnants of the plant from which the seeds where harvested).

The processing plant may also include processing equipment to then recombine the previously sorted product to form a desired product that has a desired ratio of the previously sorted product. The processing plant may also add other components to the desired product, such as in a concrete or asphalt manufacturing processing plant.

Due to, in part, environmental conditions, some processing plants are only used seasonally. For instance, processing plants that process sand or other construction materials may only operate during the summer in the northern Midwest states of the United States when corresponding construction activities occur.

While small scale/portable processing plants exist, for larger production areas, processing plants that can process large quantities of product are typically formed as fixed installations using substantially permanent structures. This reduces the cost benefit of the large processing plants that cannot be transported to other locations either for seasonal purposes or that can be transported to a new cite upon completion of a job causing the demand for the processing plant to cease. For instance, processing plants for dry screening activities are typically never moved and are fixed installations such that a super majority of the capital investment in the facility is lost upon termination of the use of the processing plant.

Another issue with current processing plants relates to the fact that many of these processing plants process product that is extremely heavy or voluminous such that transportation costs of the product can be extremely high. For instance, for sand processing plants, merely moving a plant five to ten miles so as to follow a construction job can reduce transportation costs. However, as noted above, many of the processing plants large enough for those types of jobs have yet to be developed that can be easily transported so as to eliminate significant downtime and transportation costs of the processing plant itself.

Additionally, upon failure or even predetermined maintenance intervals of many of the processing equipment of a processing plant, replacement, repair or maintenance activities can be extremely difficult due to the limited space available around the processing equipment with the processing plant's structural skeleton coupled with the typically large size of the parts of the processing equipment. The difficulty for maintenance is often multiplied merely for the fact that some of the components may be several stories above the ground.

The invention provides improvements over the current state of the art for processing plants for processing granular products.

BRIEF SUMMARY OF THE INVENTION

In one embodiment, a portable processing plant for processing a flow of generally granular material is provided. The portable processing plant includes a plurality of portable processing modules. At least some of the plurality of portable processing modules are configured to be stacked vertically to allow for a vertically downward progression of the generally granular material through the portable processing plant. Each portable processing module includes a self-supporting independent frame structure. Each portable processing module has at least one processing component affixed to the self-supporting independent frame structure. The self-supporting independent frame structures of the plurality of portable processing modules combine to define a structural skeleton of the portable processing plant. Each self-supporting independent frame structure can be removed from the structural skeleton substantially fully assembled while the at least one processing component carried by the self-supporting independent frame structure remains affixed thereto. In such an embodiment, there is no need for a separate building or structural skeleton to be formed independent form the portable processing modules to produce the processing plant. Instead, the portable processing modules substantially define the structural skeleton of the portable processing plant.

Additionally, by forming the processing plant from a plurality of portable processing modules, mixing and matching and adding or subtracting of individual modules creates significant flexibility in being able to change the processing plant to meet the demands of different target product specifications and changes in market demand. This allows also allows the plant to be used for multiple geologies. All in all, the flexibility of the processing plant eases initial capital requirements due to ability to stage ultimate target capacity.

In one embodiment, each portable processing module is configured to be mounted to a trailer with the processing component affixed to the self-supporting independent frame structure. This allows for easy transportation of the portable processing modules.

In one embodiment, an outer peripheral size of each of the plurality of portable processing modules is substantially the same. This allows for a uniform shape to the portable processing modules and improves shipping capabilities.

In one embodiment, each self-supporting independent frame structure is formed from an intermodal freight container. By using intermodal freight containers, the size of the portable processing modules is standardized for transport and structural strength is provided. For instance, the intermodal freight containers can be easily transported by way of water, rail or highway.

In one embodiment, the plurality of portable processing modules includes at least one separation unit and at least one hopper unit. The at least one separation unit includes a processing component in the form of at least one separation mechanism for separating the flow of generally granular material into at least a first separated flow of granular material and a second separated flow of granular material. The second separated flow of granular material having a different characteristic than the first separated flow of granular material. The at least one hopper unit includes a processing component in the form of first and second hoppers for holding granular material. The at least one hopper unit is positioned vertically below and vertically supports the at least one separation unit, when the structural skeleton is assembled. The two components, need not be directly adjacent one another and in other configurations may have intervening portable processing modules positioned there between.

In one embodiment, the at least one separation mechanism includes at least one screen for separating the flow of generally granular material into the first and second separated flows of granular material based on a dimensional size of the granular material.

In one embodiment, the plurality of portable processing modules includes a first separation unit, a second separation unit and a hopper unit. The first separation unit includes a processing component in the form of at least one separation mechanism for separating the flow of generally granular material into at least a first separated flow of granular material and a second separated flow of granular material. The second separated flow of granular material having a different characteristic than the first separated flow of granular material. The second separation unit includes a processing component in the form of at least one separation mechanism for separating the flow of generally granular material into at least a third separated flow of granular material and a forth separated flow of granular material. The third and fourth flows of granular material having a different characteristic than the first and second separated flows of granular material. The hopper unit includes a processing component in the form of first, second, third, and fourth hoppers for holding granular material. The first separation unit is vertically above and supported by the second separation unit. The first and second separation units are vertically above and supported by the hopper unit, when the structural skeleton is assembled and formed by the self-supporting independent frame structures of the first and second separation units and the at least one hopper unit.

In one embodiment, the plurality of portable processing modules further includes a hopper expansion unit. The hopper expansion unit includes a processing component in the form at least one hopper extension portion that cooperates with at least one of the first, second, third or fourth hoppers to expand the capacity of the corresponding first, second, third or fourth hopper. The hopper expansion unit is positioned vertically below the first and second separation units and vertically above the hopper unit.

In one embodiment, outer peripheries of the self-supporting independent frame structures are substantially rectangular, right, prisms. These shapes make it easy to sack the various portable processing modules during transport, assembly or when not in use.

In one embodiment, the plurality of portable processing modules includes a first portable processing module including a first portion of a connection arrangement The plurality of portable processing modules further includes a second portable processing module including a second portion of a connection arrangement configured to mate with the first portion of a connection arrangement when the first one of the plurality of portable processing modules is vertically placed on top of the second one of the plurality of portable processing modules.

In one embodiment, the first and second portions of the connection arrangement inhibit horizontal movement between the first and second portable processing modules. In one embodiment, the first and second portions of the connection arrangement provide a connection/receiver arrangement that is provided by male and female components.

In one embodiment, at least one connection is releasably affixed between the first and second portable processing modules that prevent the first and second portable processing modules from being vertically separated. Such a connection could be provided by a plate or connector that is releasably connected to the adjacent portable processing modules.

In one embodiment, the weight of the plurality of portable processing modules is supported through the structural skeleton provided by the self-supporting independent frame structures. Here, a separate structural skeleton to support the portable processing modules is not required to be manufactured or built at the work site.

In one embodiment, a portable elevator module is provided. The portable elevator module includes a self-supporting independent frame structure defining an outer periphery; a granular material elevator for transporting granular material. The granular material elevator is affixed to the self-supporting independent frame structure within the outer periphery.

In one embodiment, the self-supporting independent frame structure of the portable elevator module is formed from an intermodal shipping container.

In one embodiment, a personnel climbing arrangement is generally oriented with the elevator and affixed within the outer periphery. The personnel climbing arrangement allows access to the elevator and potentially additional modules.

In one embodiment, when the processing plant is assembled, the portable elevator module is positioned adjacent to the stack formed by the plurality of portable processing modules. The outer periphery of the portable elevator module having a plurality of openings sized for a person to pass therethrough and aligned with a plurality of the portable processing modules such that a person can pass from the portable elevator module into selected ones of the portable processing modules. The portable processing modules in the stack would have corresponding openings in the outer peripheries thereof.

In one embodiment, the portable elevator module includes a wiring system affixed to the self-supporting independent frame structure, the wiring system including a plurality of connectors connecting with wiring systems of a plurality of the portable processing modules of the stack.

In one embodiment, the wiring system includes both power and data wiring. Alternative embodiments can include built in fluid supply lines such as for handling gas, hydraulic fluid or pneumatics.

In one embodiment, the elevator has an input end and an output end. The elevator extends longitudinally lengthwise therebetween. The self-supporting independent frame structure of the portable elevator module being elongated in a direction being generally parallel to the length of the elevator between opposed ends. The portable elevator module being positioned vertically on the end adjacent the input end of the elevator when the portable processing plant is assembled.

In one embodiment, the system further includes at least one removable material transfer device interconnecting an output end of the elevator with at least one of the processing components. The removable material transfer device may take the form of a pipe or a chute that relies on gravity for the flow of material.

In one embodiment, a method of forming a portable processing plant for processing a flow of generally granular material at an assembly location is provided. The method includes stacking a plurality of portable processing modules vertically to allow for a vertically downward progression of the generally granular material through the processing plant. Each portable processing module includes a self-supporting independent frame structure. Each portable processing module has at least one processing component affixed to the self-supporting independent frame structure while stacking the plurality of portable processing modules. When stacked, the self-supporting independent frame structures of the plurality of portable processing modules combine to define a structural skeleton of the portable processing plant. Each self-supporting independent frame structure can be removed from the structural skeleton substantially fully assembled while the at least one processing component carried by the self-supporting independent frame structure remains affixed thereto.

In one embodiment, the method further includes transporting the plurality of portable processing modules to the location where the portable processing modules will be stacked with the processing components affixed to the corresponding self-supporting independent frame structure during transport.

In one embodiment, transporting includes transporting the portable processing modules on a trailer. The method may further include removing the portable processing modules from the trailer with the corresponding processing components affixed to the corresponding self-supporting independent frame structure.

In one embodiment, the method includes vertically fixing adjacently stacked portable processing modules to prevent adjacent portable processing modules from being vertically separated while being fixed to one another.

In one embodiment, the method includes vertically fixing adjacently stacked portable processing modules using at least one connector.

In one embodiment, the method includes horizontally constraining adjacent portable processing modules while vertically stacking to prevent horizontal motion between the adjacent portable processing modules.

In one embodiment, the plurality of portable processing modules includes a first portable processing module including a first portion of a connection arrangement. The plurality of portable processing modules includes a second portable processing module including a second portion of a connection arrangement configured to mate with the first portion of a connection arrangement when the first one of the plurality of portable processing modules is vertically placed on top of the second one of the plurality of portable processing modules. Horizontally constraining adjacent portable processing modules includes mating the first and second portions of the connection arrangement.

In one embodiment, a substantially permanent base pad is provided. The method includes stacking the plurality of portable processing modules vertically on the base pad. Typically, the base pad would be formed from concrete and would not be transported when the processing plant is transported to a new site.

In one embodiment, the method includes horizontally fixing the position of a bottom one of the plurality of portable processing modules to the base pad.

In one embodiment, prior to the step of stacking, the method includes disassembling an assembled portable processing plant including at least some of the plurality of portable processing modules by removing the at least some of the plurality of portable processing modules from the assembled portable processing plant; and transporting the at least some of the plurality of portable processing modules from the assembled portable processing plant to the assembly location with the processing components affixed to the corresponding self-supporting independent frame structures.

In one embodiment, the method further includes interconnecting at least two of the processing components by at least one removable material transfer device after the corresponding portable processing modules have been stacked vertically.

In one embodiment, the at least one removable material transfer device is a chute extending between the two processing components.

In one embodiment, the material transfer device extends across a boundary formed between two adjacent portable processing modules and extends into an interior of each of the portable processing modules generally defined by the self-supporting independent frame structures of the portable processing modules. The boundary is defined by adjacent portions of the peripheries of the two adjacent portable processing modules.

In one embodiment, a method of disassembling a portable processing plant is provided. The processing plant includes a plurality of portable processing modules stacked vertically to allow for a vertically downward progression of the generally granular material through the processing plant. Each portable processing module includes a self-supporting independent frame structure. Each portable processing module has at least one processing component affixed to the self-supporting independent frame structure. The self-supporting independent frame structures of the plurality of portable processing modules combine to define a structural skeleton of the portable processing plant. The method includes removing each portable processing module while the at least one processing component carried by the self-supporting independent frame structure remains affixed thereto.

In one embodiment, the method includes placing each portable processing module onto a trailer and transporting the portable module to a new location.

In one embodiment, a portable elevator module for a processing plant is provided. The portable elevator module includes a self-supporting independent frame structure defining an outer periphery and a granular material elevator for transporting granular material. The granular material elevator is affixed to the self-supporting independent frame structure within the outer periphery.

In one embodiment, the self-supporting independent frame structure is configured to be mounted to a trailer for transport.

In one embodiment, the self-supporting independent frame structure is formed from an intermodal shipping container, such as a 53 foot intermodal shipping container.

In one embodiment, a personnel climbing arrangement generally oriented with the elevator is affixed within the outer periphery of the self-supporting independent frame structure.

In one embodiment, the personnel climbing arrangement is one of: a ladder, a plurality of ladders, or a plurality of steps.

In one embodiment, a wiring system affixed to the self-supporting independent frame structure, the wiring system includes a plurality of connectors for connecting with wiring systems of a plurality of other portable modules of a processing plant that are external to the portable elevator module.

In one embodiment, the elevator has an input end and an output end. The elevator extends longitudinally lengthwise therebetween. The self-supporting independent frame structure is elongated in a direction being generally parallel to the length of the elevator between opposed ends.

In one embodiment, a portable processing plant for processing a flow of generally granular material is provided that includes a first separation unit and a hopper unit. The first separation unit is configured to separate the flow of generally granular material into at least a first separated flow of granular material and a second separated flow of granular material. The first and second separated flows of granular material have at least one different physical characteristic. The first separation unit includes a first frame structure. The hopper unit includes a first hopper for operably receiving at least a portion of the first separated flow of granular material and a second hopper for operably receiving at least a portion of the second separated flow of granular material. The hopper unit including a second frame structure. The first separation unit being operably mounted above the hopper unit. The first frame structure and the second frame structure form modular components of a structural skeleton of the portable processing plant.

In another embodiment, a portable bulk-load out module for a processing plant is provided. The bulk-load out module includes a self-supporting independent frame structure, a granular material elevator, and a hopper. The self-supporting independent frame structure defines an outer periphery. The granular material elevator transports granular material and is affixed to the self-supporting independent frame structure within the outer periphery. The hopper stores the granular material and is also affixed to the self-supporting independent frame structure within the outer periphery. The granular material elevator supplies the granular material to the hopper.

In one embodiment, the bulk-load out module includes a metering assembly coupled to the hopper for metering the flow of granular material from the hopper.

In one embodiment, the metering assembly includes at least one chute that extends through the outer periphery of the self-supporting independent frame structure.

In one embodiment, the granular material elevator is a bucket elevator.

In one embodiment, the hopper has an L-shaped cross-section.

In one embodiment, the granular material elevator is located within a void defined by the L-shaped cross-section of the hopper.

In one embodiment, the self-supporting independent frame structure is formed from an intermodal shipping container. In a more particular embodiment, the intermodal shipping container is between 40 and 55 feet in length.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
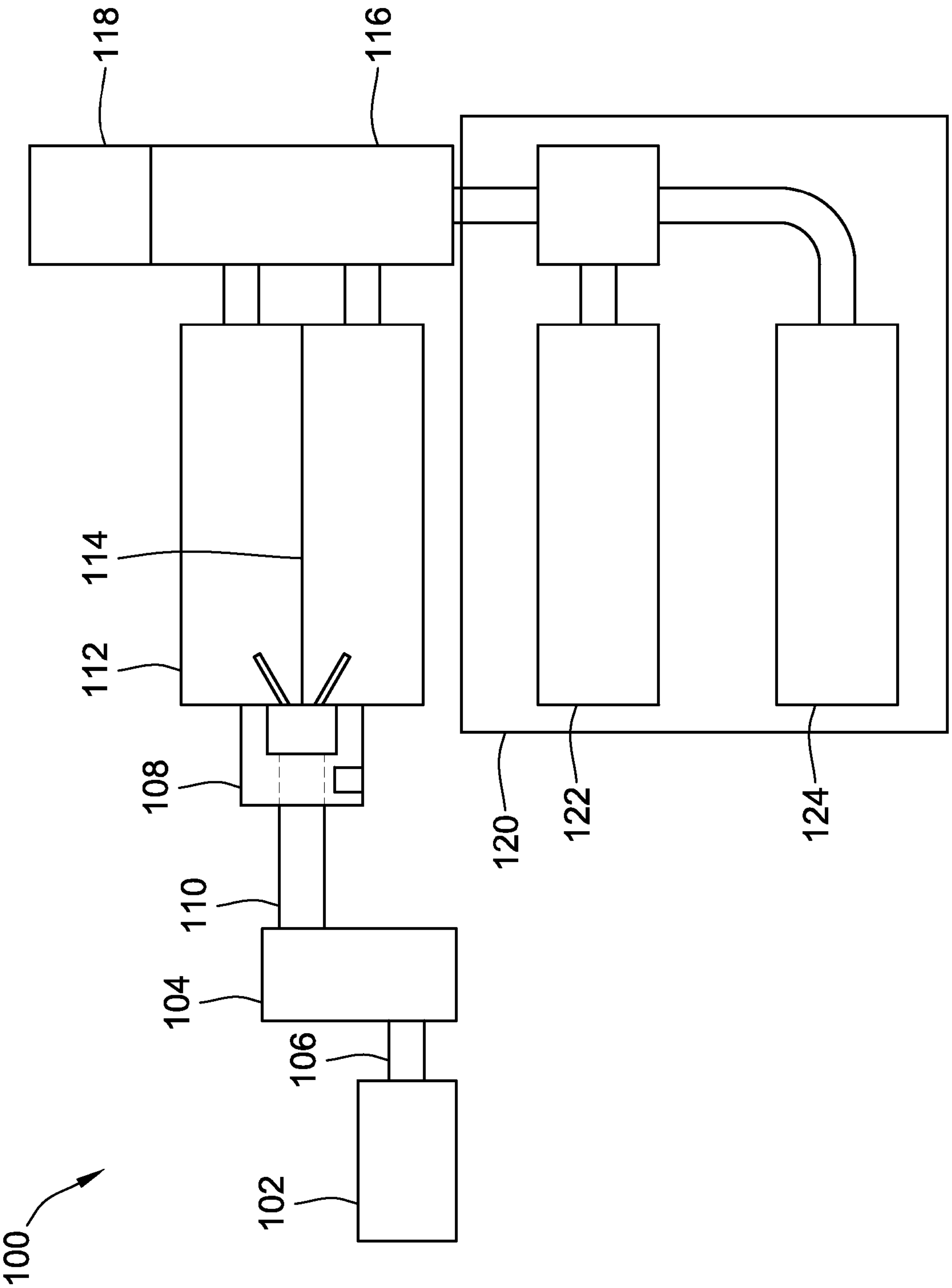
FIG. 1 is a schematic illustration of a processing center for processing bulk granular material.

FIG. 1 is a simplified schematic illustration of a processing center 100 for processing bulk granular material. The illustrated processing center is based on a sand processing center. However, the teachings of the present invention are applicable to processing other granular material. The processing center 100 of the illustrated embodiment is configured to receive bulk granular material, sort the material based on a predefined characteristic (e.g. different size portions), recombine the sorted material to form a desired product of the granular material that has a desired ratio of the sorted material, and then to package the desired product for shipment. While the processing center 100 is equipped to recombine the sorted material, the processing center could maintain the material separated and package the material as independent and separate products.

The processing center 100 is designed to be, at least in part, highly portable such that it, or at least part of it, can be easily transported to a new site and reassembled. As such, and as will be described below, a number of the processing center 100 components or structures are configured to be modular such that they can be easily disassembled from the processing center 100, transported to a new location, and then reassembled with limited downtime. The modularity also permits processing equipment to be more easily removed from the overall system for maintenance and repair operations. The modularity also allows for customization of various portions of the system to tailor the processing center 100 to the particular demands at a particular assembly site.

To provide the modularity, a plurality of the components will be provided as portable processing modules that each include a self-supporting independent frame structure that provides structural rigidity for the module. Affixed to the self-supporting independent frame structure will be at least one processing component for some form of processing of the material (i.e. transport, sorting, drying, metering, weighing, storage, etc.). These portable processing modules are configured such that the processing component(s) affixed to the self-supporting independent frame structure thereof when the processing center 100 is fully assembled and operational will also be affixed to and shipped with the self-supporting independent frame structure when being transported to and from a site.

In some embodiments, the self-supporting independent frame structures are formed from standard intermodal shipping containers so as to allow for standardization of the individual portable processing modules and allow for easier more cost efficient worldwide transport of the portable processing modules. The individual intermodal shipping containers may be modified to allow for access into and interconnection of the individual processing components, however, in general, the standard outer periphery defined by the intermodal shipping container shall remain, albeit some minor variations are contemplated.

By using the standard intermodal shipping containers as the basis for the portable processing modules, the portable processing modules can stacked vertically for storage when not in use, stacked vertically to assemble various segments of the processing center 100 as will be described in more detail, easily attached to transportation devices such as rail, over-the-road trailers and even cargo ships.

While some embodiments directly use prefabricated intermodal shipping containers as the basis for the self-supporting independent frame structure, the self-supporting independent frame structure could be formed separately but configured to provide for the modularity necessary to provide for simple disassembly and assembly.

Various components of the processing center 100 will now be discussed.

The processing center 100 includes a portable processing module in the form of a bulk material hopper 102 where bulk material to be processed by the processing center 100 is loaded into the system. Typically, an end loader will load material into the bulk material hopper 102 or an operator may use a truck to load the bulk material into the bulk material hopper 102 from a pile or other supply source. The bulk material hopper 102 will typically include processing components in the form of bulk storage hoppers, metering and/or weighing mechanisms, dust collection devices, and conveyors. The bulk material hopper 102 will meter the rate at which the bulk material is supplied to the dryer 104 by conveyor 106.

The bulk material will be transported from the bulk material hopper 102 to a dryer 104 by conveyor 106 where the moisture of the bulk material can be reduced to improve downstream processing and handling. The dryer could be formed as a portable processing module in some embodiments.

The dried material will be transported from the dryer 104 to a portable processing module in the form of a portable elevator module 108 by a conveyor 110.

The portable elevator module 108 is designed to lift the dried material vertically and supply the material to one or more processing towers. In the illustrated embodiment, the portable elevator module 108 supplies the dried material to a pair of processing towers or processing plants in the form of screen towers 112, 114. While not shown, the portable elevator module 108 may be laterally, mechanically connected to the screen towers 112, 114 to provide stability to the overall unit. The mechanical connection could be provided by quick connectors or nuts and bolts that couple the adjacent modules. The screen towers 112, 114 are formed from a plurality of vertically stacked portable processing modules that include processing components configured to separate the material into different sized product, to store the separated material, meter the separated material at a desired rate into a desired product, and then to dispense the desired product. In this embodiment, the screen towers 112, 114 are substantially identical. Further, while two screen towers 112, 114 are illustrated, more or less screen towers 112, 114 could be incorporated.

Product exiting the screen towers 112, 114 is dispensed onto a bi-directional conveyor module 116 where the product can be transported to a bulk-load out module 118 or into a packaging facility 120. The bulk-load out module 118 is configured to dispense product from the screen towers 112, 114 into a truck trailer.

While illustrated as single modules, the bi-directional conveyor module 116 and bulk-load out module 118 may be provided by more than one module interconnected.

The packaging facility 120 is configured to package the desired product for shipment in individual packages. The packaging facility 120 includes a bulk packaging line 122 that may be formed from one or more portable processing modules. The bulk packaging line 122 packages the product in bulk packages. The packaging facility 120 also includes a small packaging line 124 that may be formed from one or more portable processing modules. The small packaging line 124 packages the product in to small packages. These lines may include processing components in the form of conveyors, wrapping and packaging equipment, robotic arms for stacking the packages or otherwise palletizing the packages.

In some processing centers 100, the packaging facility 120 is an enclosed building or warehouse that will typically remain at the site as a permanent installation after the portable processing modules have been removed and transported to a new site. The components external to the packaging facility 120 will typically be placed on and secured to a concrete foundation or slab that provides stability to the components. Such a concrete foundation would also be a permanent installation that remains at the site after the portable processing modules have been removed and transported to a new site.

In one embodiment, the portable processing modules that are used within the packaging facility 120 will be delivered to the processing center, typically, on a trailer. The packaging facility will be designed such that the trailers will be pinned or otherwise directly secured the concrete foundation of the packaging facility 120. Some of these portable processing modules will be enclosed with sidewalls or tarps. Once the trailers are in the desired location, the tarps can be removed or the sidewalls folded down or otherwise removed to provide access to the processing equipment carried therein.

This configuration and capability will provide for reduced set up time and insure precise location of the portable processing modules. Additionally, this will allow the processing equipment to be located within the building of the packaging facility merely by maneuvering the trailer. This allows for the processing equipment to be located within the packaging facility 120 without the need of an overhead crane, which can significantly reduce cost and improve set-up time.

Figure 2:
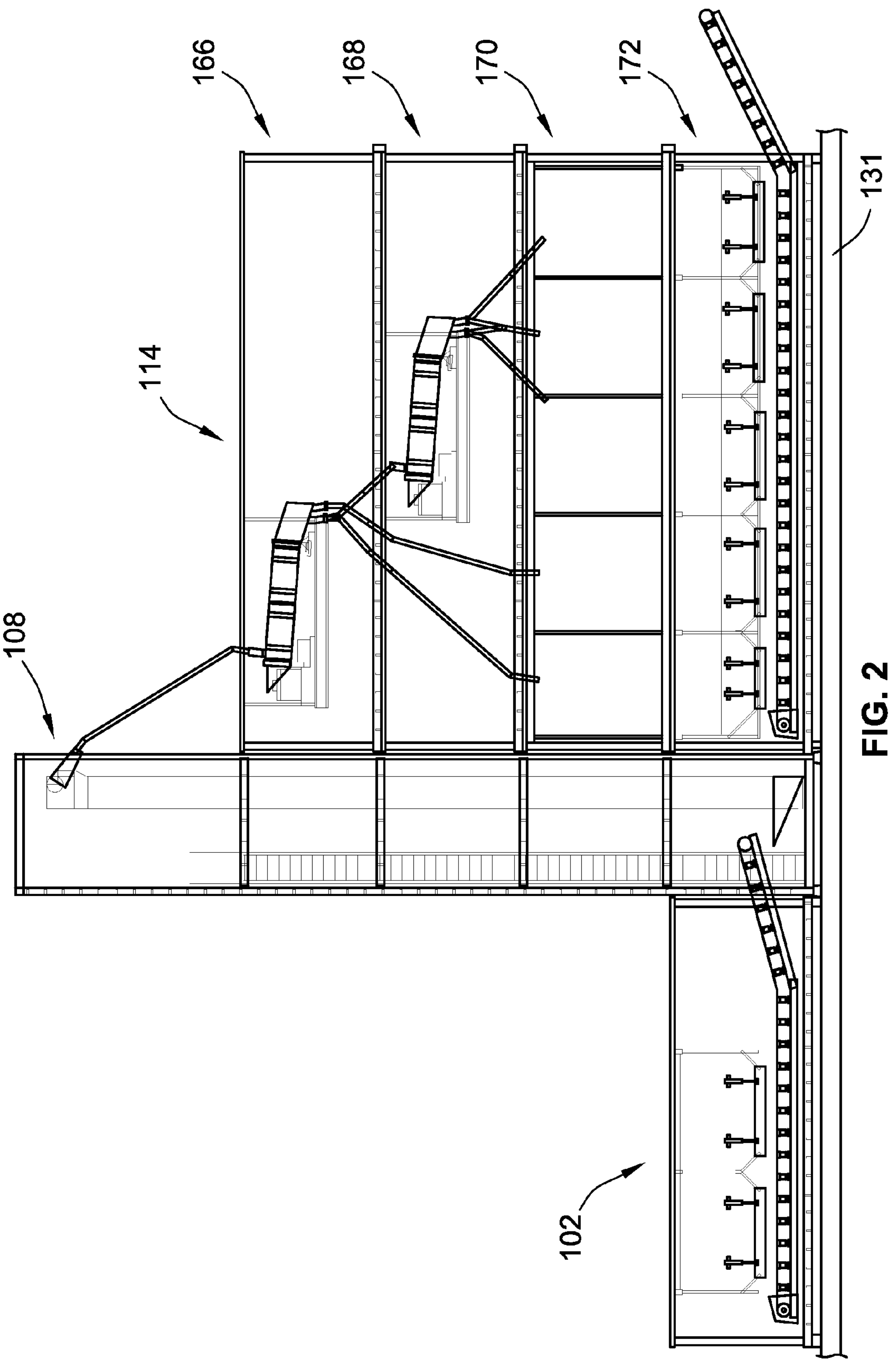
FIG. 2 is a simplified illustration of a portion of the processing center of FIG. 1 including a processing plant for processing the granular material.

FIG. 2 is a simplified illustration of the portable processing plant of FIG. 1. FIG. 2 illustrates a simplified illustration of the portable elevator module 108 and one of the screen towers 114. FIG. 2 also includes a bulk material hopper 102 and eliminates the dryer 104. However, typically, a dryer would be positioned between the bulk material hopper 102.

Figure 3:
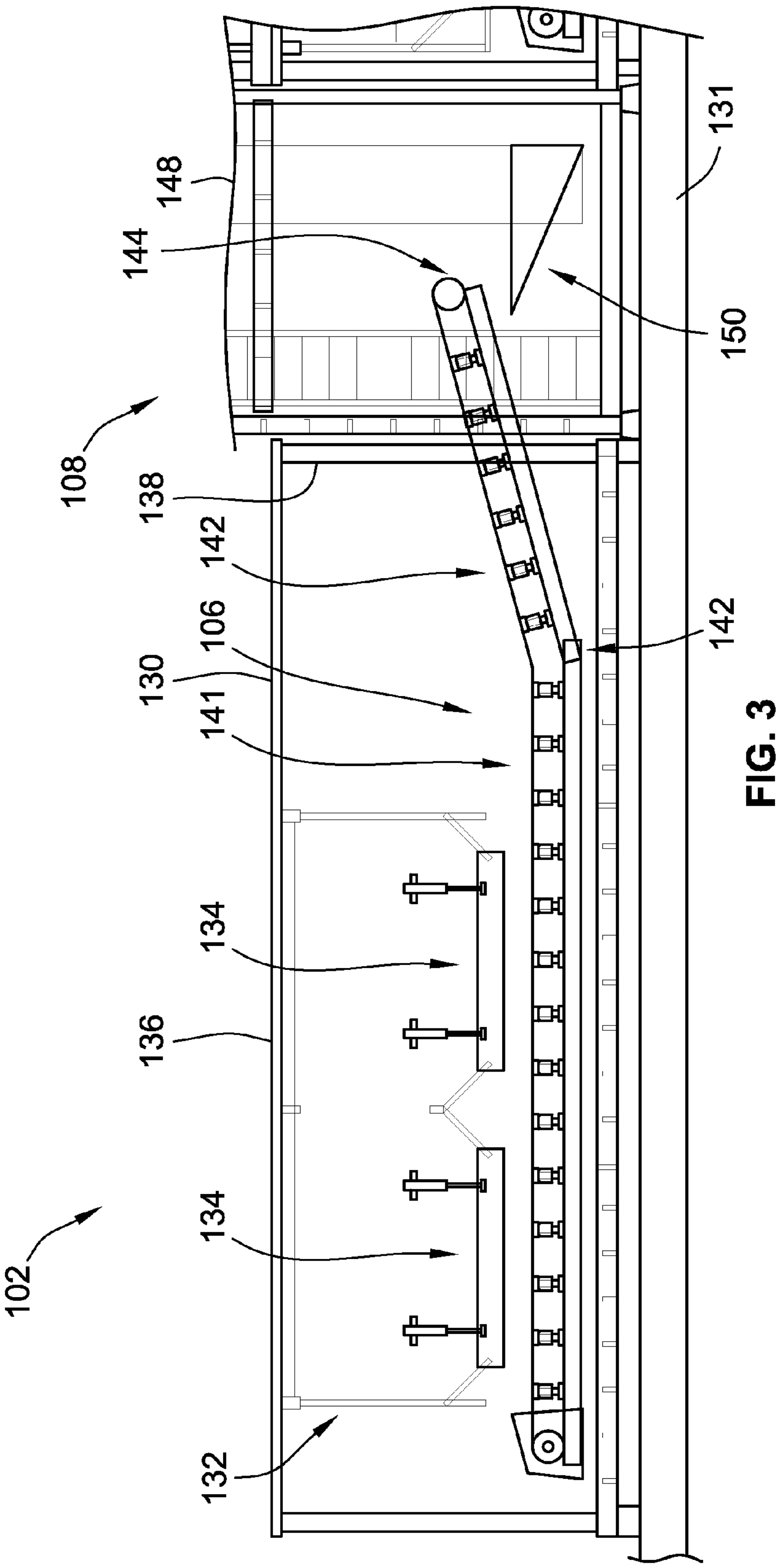
FIG. 3 is an enlarged portion of FIG. 2 illustrating the bulk material hopper module.

With reference to FIG. 3, the bulk material hopper 102 includes a self-supporting independent frame structure 130 that has generally rectangular sides, ends and top and bottom such that the self-supporting independent frame structure 130 is generally a rectangular, right, prism. The self-supporting independent frame structure 130 would typically be secured to concrete slab 131 to prevent movement thereof during operation. This may be done by bolting or using connectors that are designed to cooperate with the self-supporting independent frame structure 130. The connectors could also be used to secure the bulk material hopper 102 to a trailer or other transportation device for transporting the bulk material hopper 102.

A processing component in the form of a hopper 132 is affixed to the self-supporting independent frame structure 130. The hopper 132 includes a pair of metering devices 134 configured to control the flow of product onto conveyor 106. These metering devices 134 can be controlled independently.

The top 136 of the bulk material hopper 102 will have an opening for dispensing bulk material into hopper 132. The rest of the top 136 may be enclosed, such as if an intermodal shipping container was used as the self-supporting independent frame structure 130. More particularly, intermodal shipping containers typically have sidewalls such that the containers are fully enclosed such as by corrugated metal that is attached to the structural members of the frame thereof. Typically, the entire top 136 of the unit will be open during operation. However, during shipment, a sheet metal cover or tap may be attached to the module so as to keep out snow, rain or other debris.

The conveyor 106 extends through an opening in the end 138 and into the portable elevator module 108. The conveyor 106 is also, at least partially, affixed to the self-supporting independent frame structure 130. The conveyor 106 may have a pivoting section 140 that communicates with a generally fixed section 141. The pivoting section 140 is configured to pivot about pivot point 142 so that free end 144 can be pivoted within the outer periphery defined by self-supporting independent frame structure 130 for transport.

Alternatively, the pivoting section 140 may merely be a removable section that can be disconnected and placed within the self-supporting independent frame structure 130 for transport. In such a configuration, the removable portion of the conveyor would be considered a removable material transfer device because it would generally be easily removed from the self-supporting independent frame structure for disassembly and transport. However, the fixed section 141 and hopper 132 would remain affixed to the self-supporting independent frame structure 130 for transport and during assembly of the processing center 100.

The conveyor 106 supplies product to the portable elevator module 108 where the product is lifted to the top of the screen towers 112, 114 where it is allowed to flow vertically downward, generally, via gravity flow.

Figure 4:
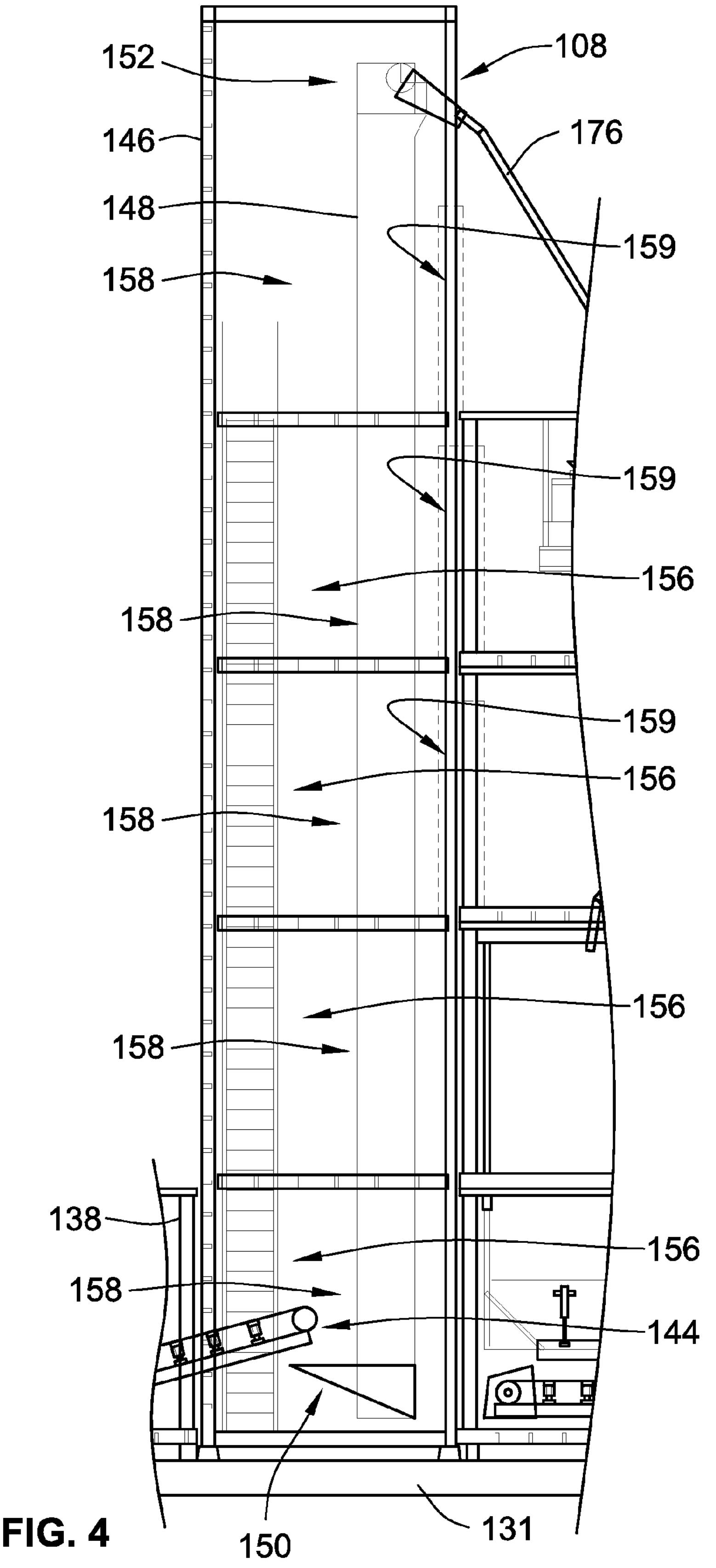
FIG. 4 is an enlarged portion of FIG. 2 illustrating the portable elevator module.
Figure 5:
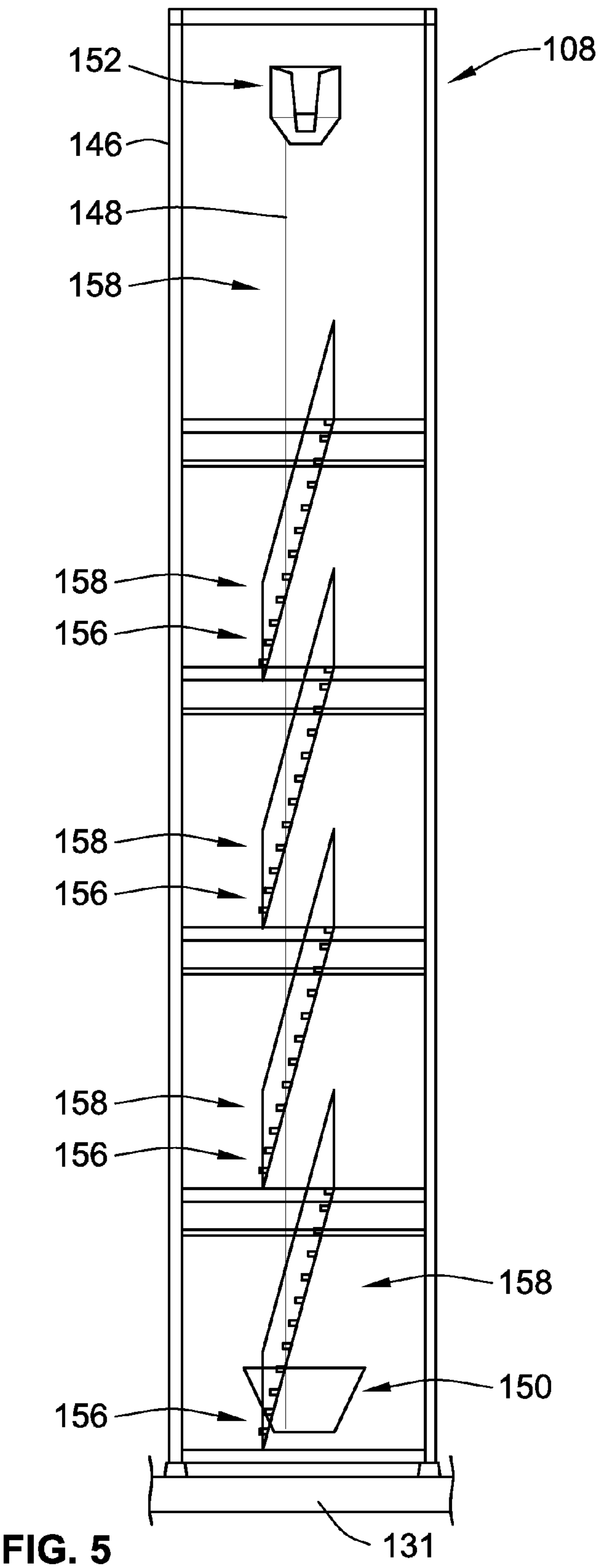
FIG. 5 is a further illustration of the portable elevator module of FIG. 4.

With reference to FIGS. 4 and 5, the portable elevator module 108 includes a self-supporting independent frame structure 146. In this embodiment, the self-supporting independent frame structure 146 is formed from a fifty-three foot intermodal shipping container. The self-supporting independent frame structure 146 includes rectangular sides, ends and top and bottom to form a rectangular, right prism.

An elevator 148 is affixed to the self-supporting independent frame structure 146 and is configured to remain affixed thereto during assembly, disassembly and transport of the portable elevator module 108 within the portable processing plant.

The elevator 148 extends longitudinally from an input end 150 to an outlet end 152 and is elongated therebetween. The input end 150 is proximate one end of the self-supporting independent frame structure 146 and the output end is proximate an opposite end of the self-supporting independent frame structure 146. The self-supporting independent frame structure 146 is elongated between the ends.

In operation, the portable elevator module 108 will be turned on end such that it extends vertically upward in the direction of elongation, e.g. such that the elevator 148 extends generally vertically upward when the processing plant is assembled.

The pivoting section 140 of the conveyor 106, or conveyor 110 from dryer 104, will extend into the portable elevator module 108 through an opening in the bottom 154 of the self-supporting independent frame structure 146.

The portable elevator module 108 will also provide the ability for operators and maintenance personnel to climb to various levels of the screen towers 112, 114. As such, the portable elevator module 108 will have a personnel climbing arrangement generally oriented with the elevator 148 and affixed within the outer periphery of the self-supporting independent frame structure 146. In the illustrated embodiment, the personnel climbing arrangement is in the form of multiple sets of steps 156. Alternative embodiments may merely use a latter affixed to the self-supporting independent frame structure 146.

The steps 156 provide access to several different floors 158 that are provided in the portable elevator module 108. These floors 158 are generally parallel to the ends of the self-supporting independent frame structure 146. The floors 158 are typically spaced at intervals generally consistent with the height of the various layers of the laterally adjacent screen towers 112, 114. One or more of the floors 158 may have a corresponding opening 159 formed through the top of the self-supporting independent frame structure 146 of the portable elevator module 108 to permit access to an adjacent portable processing module of the screen towers 112, 114 by an operator or maintenance personnel.

The floors, 158, the steps 156, and elevator 148 would typically remain affixed to the self-supporting independent frame structure 146 during transport, assembly and disassembly of the processing center 100 such that these components all move during these processes as a single module.

The portable elevator module 108 is designed to provide central wiring capabilities for the devices within the screen towers 112, 114. More particularly, main cables for data and electricity will extend longitudinally within the portable elevator module 108 and include connectors that will interconnect with wiring of the individual portable processing modules within the screen towers 112, 114. In this manner, the wiring need not extend external of the screen towers 112, 114 or through the individual modules that are stacked vertically on top of one another. The main wiring and connectors would be positioned internal to the self-supporting independent frame structure 146 of the elevator module 108. This portion of the wiring system would, again, remain affixed to the self-supporting independent frame structure 146 during travel, assembly and disassembly. By having the wiring system as part of and built into a portable processing module, such as the portable elevator module, it is easy to route the wiring and prevents the need for rerouting and removal during each set-up and tear down process.

The wiring may be used to provide the electrical requirements for the various modules including driving electric motors and lighting. The wiring will also provide control system wiring for indicators and controls of the various electrical components of the processing equipment. Other systems that could include wiring that is included in the built in wiring include production control systems, communication systems including audio and visual communication, computer systems, dust control systems, quality control systems, and processing control systems including weigh scales. Beyond wiring arrangement, the various modules could include built in fluid supply lines, such as for supplying gas for powering a module that includes a dryer or supplying hydraulic or pneumatic controls.

Figure 6:
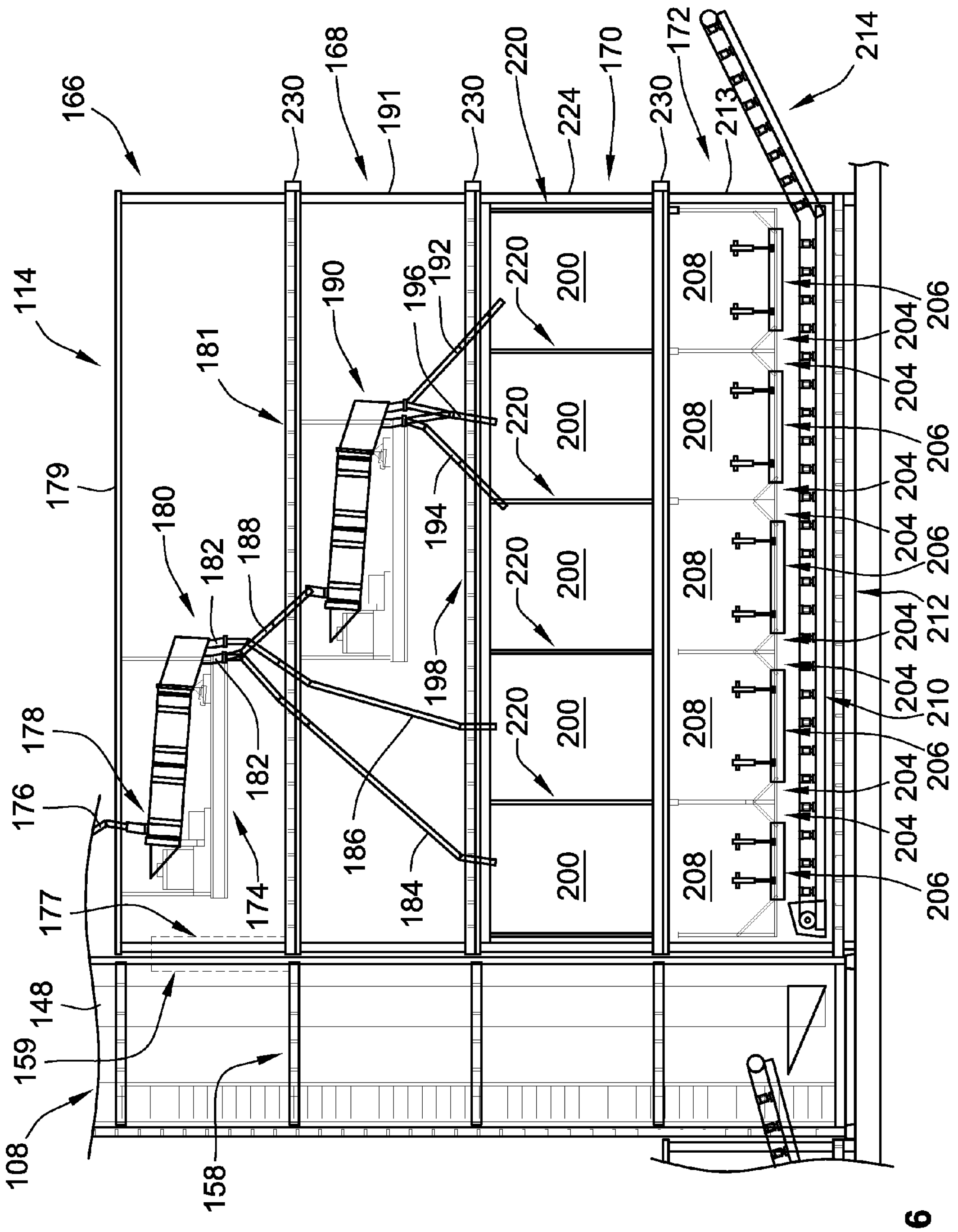
FIG. 6 is an enlarged portion of FIG. 2 illustrating the one of the screen towers.

FIG. 6 illustrates one of the two screen towers 112, 114 of FIG. 1. Screen tower 114 includes a plurality of portable processing modules stacked vertically to allow for a vertically downward progression of the dried material from one portable processing module to the next. Typically, the dried material will be gravity fed.

The screen tower 114 includes portable processing modules in the form of first and second separation units 166, 168, a hopper expansion unit 170 and a hopper unit 172.

The first separation unit 166 includes a processing component in the form of a separation mechanism in the form of separation screen assembly 174. The separation screen assembly is configured to separate the drier material into different portions of material based on different material characteristics. Typically, the different material characteristic is the size of the material. The dried material is supplied to the first separation screen assembly 174 by a removable material transfer device in the form of a removable pipe or chute 176 from the output end 152 of the elevator 148 to an inlet 178 of the first separation screen assembly 174. The first separation screen assembly 174 is affixed to a self-supporting independent frame structure 179 of the first separation unit 166. The first separation screen assembly 174 remains affixed to the self-supporting independent frame structure 179 during assembly, disassembly and transport.

The self-supporting independent frame structure 179 includes an opening 177 in its outer periphery that aligns with a corresponding opening 159 in the outer periphery of the portable elevator module 108. Similarly, the corresponding floor 158 of the portable elevator module 108 aligns with a floor or bottom 181 of the self-supporting independent frame structure 179 of the first separation unit 166. This configuration allows operators or maintenance personnel to access the interior of the first separation unit 166 for maintenance, repairs, quality assurance testing assembly, disassembly or other general access to the components within the first separation unit 166.

The first separation screen assembly 174 includes an outlet 180 that includes a plurality of outlet ports 182. The outlet ports 182 are connected to removable material transfer devices in the form of chutes or pipes 184, 186, 188. The chutes 184, 186, 188 direct the separated portions of material to different locations within the screen tower 112. These chutes 184, 186, 188 will pass through openings in the outer periphery defined by the self-supporting independent frame structure 179 and particularly the bottom 181 thereof.

The second separation unit 168 is substantially similar to the first separation unit 166. The second separation unit supports the first separation 166. This second separation unit 168 includes a second separation screen assembly 190 configured to further separate a portion of the dried material that exits the first separation screen assembly 190. The second separation screen assembly 190 is affixed to a self-supporting independent frame structure 191 of the second separation unit 168. However, the second separation screen assembly 190 is located in a different position so that it can receive the product supplied from the first separation screen assembly 174.

A screen assembly can have numerous decks where each deck has a different size. Typically, a screen assembly will have 2, 3, or 4. However, more or less decks are contemplated.

A plurality of removable material transfer devices, in the form of chutes or pipes 192, 194, 196 are connected to the outlet end of the second separation screen assembly 190.

Chutes or pipes 184, 186, 192, 194, 196 extend through the outer periphery of the second separation unit 168 and particularly, a bottom 198 thereof and into the hopper expansion unit 170. The chutes or pipes 184, 186, 192, 194, 196 extend through a top of the hopper expansion unit 170. The chutes or pipes 184, 186, 192, 194,196 can be disconnected and stored within the individual modules during transport. The chutes or pipes 184, 186, 192, 194, 196 will then need to be reconnected during assembly at a new site.

The hopper expansion unit 170 cooperates with the hopper unit 172 to provide a plurality of hoppers 200 for storing different portions of the dried material based on the different characteristics used by the first and second separation screen assemblies 174, 190 to separate the dried material into different portions. Most typically, the different hoppers 200 will store different sizes of the dried material.

The hopper unit 172 includes a plurality of processing components in the form of hopper bases 204 that include a metering unit 206 and a storage portion 208 vertically above the metering unit 206. The hopper bases 204 are configured to meter the flow of the different sorted products onto conveyor 210. The metering units 206 can be controlled independently so as to provide a desired ratio of the different separated products within the various hoppers 200. Conveyor 210 includes a fixed portion 212 and a pivoting portion 214, much like conveyor 106 discussed above.

The hopper unit 172 includes a self-supporting independent frame structure 213 to which the hopper bases 204 are fixedly attached such that they remain attached to the self-supporting independent frame structure 213 during assembly, disassembly and transport. At least the fixed portion 212 of the conveyor 210 remains fixed to the self-supporting independent frame structure 213 during assembly, disassembly and transport. The pivoting portion 214 may pivot into, slid into, or otherwise be removed from the self-supporting independent frame structure 213 during assembly, disassembly and transport.

The hopper expansion unit 170 sits on top of the hopper unit 172 and includes a plurality of processing components in the form of hopper expansion sections 220 that define chambers that expand the capacity of the storage portion 208 of the hopper bases 204. The hopper expansion sections 220 align with the storage portion 208 of the hopper bases 204.

The hopper expansion sections 220 would be affixed to a self-supporting independent frame structure 224 of the hopper expansion unit 170. The hopper expansion sections 220 stay affixed to the self-supporting independent frame structure 224 during assembly, disassembly and transport.

The chutes/tubes 184, 186, 192, 194, 196 merely empty into the hopper expansion sections 220.

In some embodiments, the screen towers 112, 114 need not include multiple separation units 166, 168 (only one would suffice for less separation) or the hopper expansion unit 170. In other embodiments, other portable processing modules that have different processing equipment other than or in addition to the screen assemblies may be incorporated.

It is a feature of the screen towers that the self-supporting independent frame structures of the various portable processing modules 166, 168, 170, 172 form the structural skeleton of the screen towers 112, 114. By having the portable processing modules 166, 168, 170, 172 stacked vertically, the weight of the upper portable processing modules 166, 168, 170 is all supported by the corresponding ones of the portable processing modules vertically therebelow. As such, the weight of portable processing modules 166, 168, 170 is substantially entirely supported by the self-supporting independent frame structure 213 of the hopper unit 172, namely the lowest most portable processing module.

The self-supporting independent frame structures 179, 191, 213, 224 of the first and second separation units 166, 168, hopper expansion unit 170, and hopper unit 172 are preferably formed from or are similar to intermodal shipping containers. As such, the self-supporting independent frame structures 179, 191, 213, 224 are configured to easily stack one on top of the other to assist in assembly of a corresponding screen tower. More particularly, the various self-supporting independent frame structures 179, 191, 213, 224 may include portions of a connection arrangement that may be a connection/receiver arrangement that interlocks adjacent ones of the frame structures together. Preferably, the connection/receiver arrangement would prevent, at a minimum, horizontal motion between the adjacent frame structures.

Additionally, releasable connections may be provided that vertically secure adjacent frame structures to one another. Such a connection could take the place of brackets that are releasably affixed to the adjacent frame structures after the frame structures are stacked vertically. A simplified connection 230 is illustrated in FIG. 6. These connections as well as the connection/receiver arrangement discussed above helps provide structural stability to the structural skeleton of the screen towers 112, 114 defined by the self-supporting independent frame structures 179, 191, 213, 214.

The connection/receiver arrangement will typically include one portion that is a female component and another portion that is a male component configured to mate with the female component.

Typically, the concrete slab 131 will include a portion of the connection/receiver arrangement so as to help align the screen towers thereon and provide stability and improved alignment.

Additionally, any transportation device, e.g. a trailer, could include a portion of the connection/receiver arrangement so as to facilitate alignment and attachment of the individual portable processing modules.

This system 100, and particularly the portable elevator module and the screen towers 112, 114, are designed such that a separate building is not needed to be constructed and then fitted with the processing equipment for the screen towers. Instead, the modularity of the individual portable processing modules combines the structural components of the ultimate skeletal structure of the screen towers 112, 114 with processing components. This modularity significantly simplifies assembly, disassembly and transportation of the processing center 100 and particularly various components thereof. Further, this configuration converts what would have historically been a fixed installation to a portable installation.

The modularity of the system allows for easy customization of different processing plants/screen towers depending on particular operating needs. For instance more or less numbers of separation units could be used. More or less hopper capacity can be provided. Further, additional processing components that have not been identified herein could be incorporated.

Further, to the extent that there is a need for significant repair on one of the processing components, the screen tower or processing plant could be disassembled, the particular module with the component could be removed and swapped with a new module, and then the system reassembled. Or even if the module is not swapped with a working module, improved accessibility to the processing components with the particular portable processing module can be provided. Further, by being able to easily assemble and disassemble the processing plant/screen tower, upper portable processing modules can be removed to provide improved access to lower portable processing modules for unexpected or scheduled maintenance.

This is significantly different from prior systems where the screen towers are based on or generally include a structural skeleton more like a standard building and that is not modular or generally portable but would be a fixed building.

Figure 7:
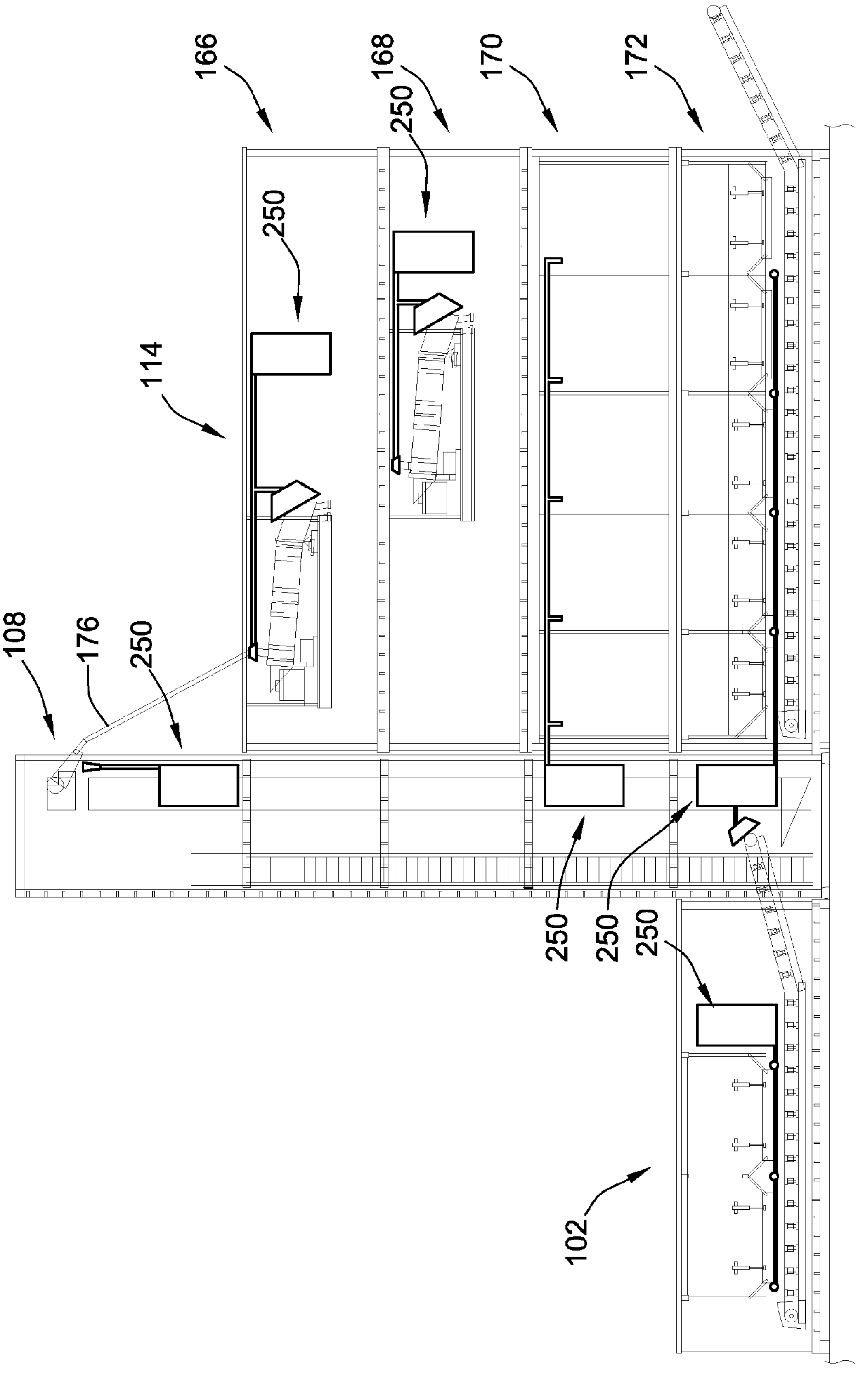
FIG. 7 is a similar illustration as FIG. 2 but including the dust collection system.

FIG. 7 is similar to FIG. 2 but provides further details. More particularly, many processing plants will include dust reduction systems. FIG. 7 illustrates a simplified version of a dust reduction system being added to the processing plant of FIG. 2. The dust reduction system may also be called a baghouse dust collector. The dust reduction system has a plurality of components 250 that provide vacuum that collects dust that is formed at inlets and outlets of the various processing components of the system.

Figure 8:
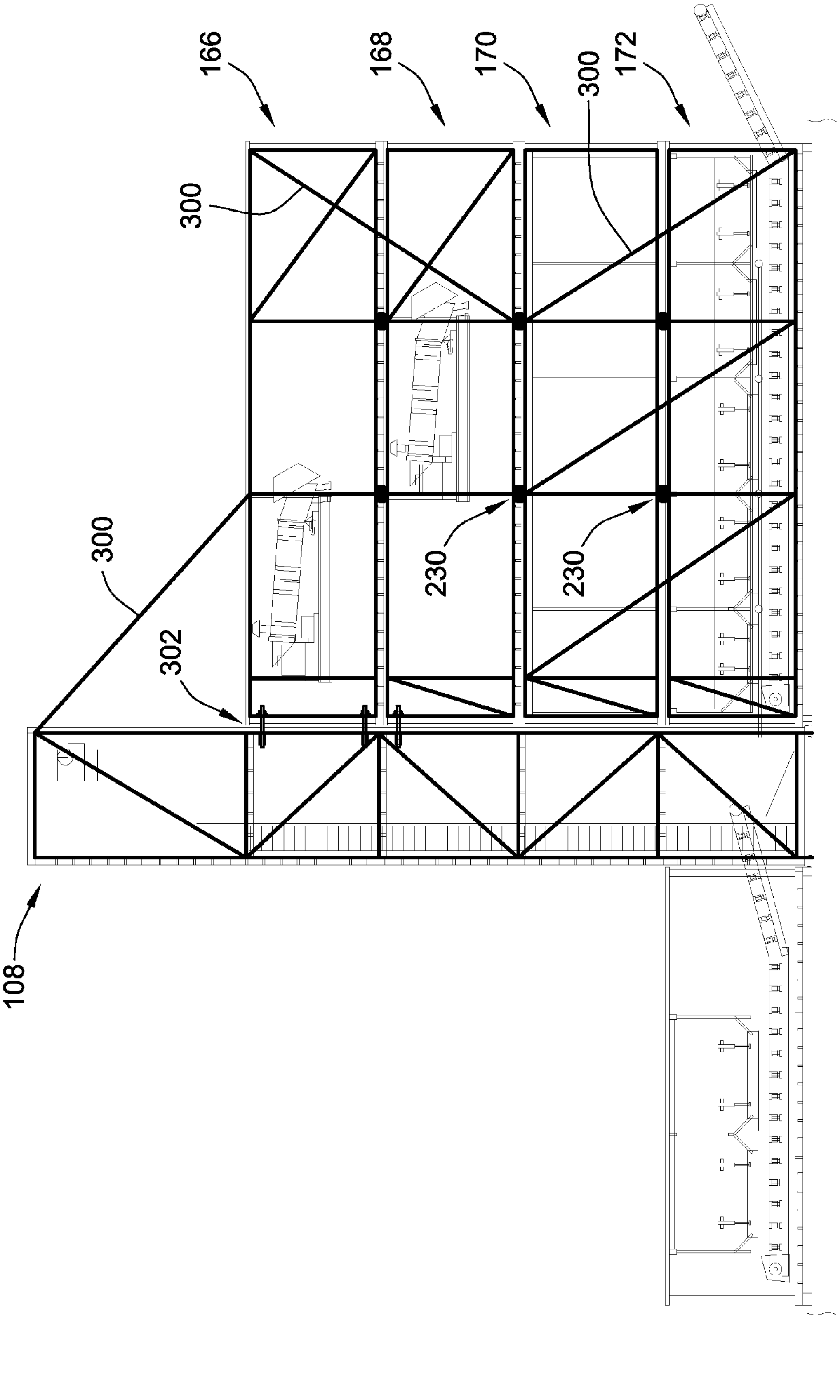
FIG. 8 is a similar illustration as FIG. 2 but including additional structural support.
Figure 9:
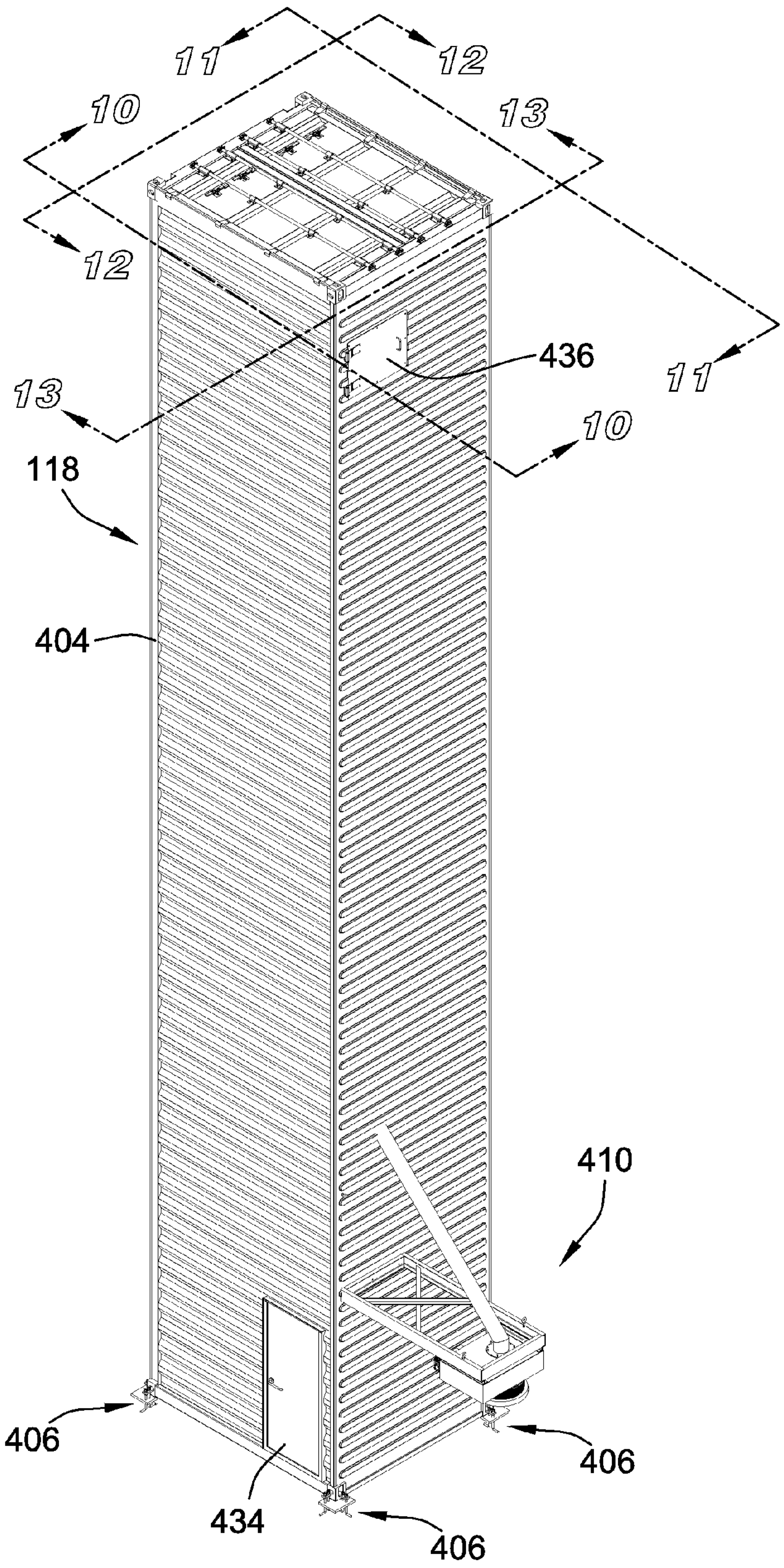
FIG. 9 is a perspective illustration of a bulk-load out module of the processing center of FIG. 1.
Figure 10:
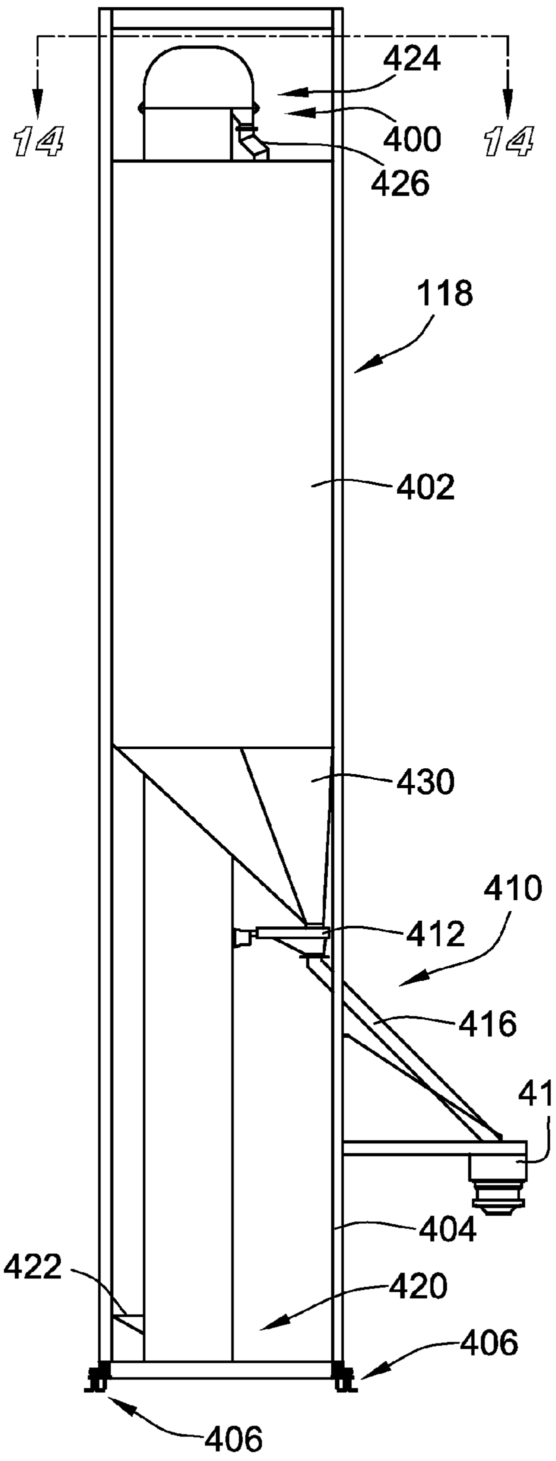
FIGS. 10-14 are simplified cross-sectional illustrations of the bulk-load out module of FIG. 9.
Figure 11:
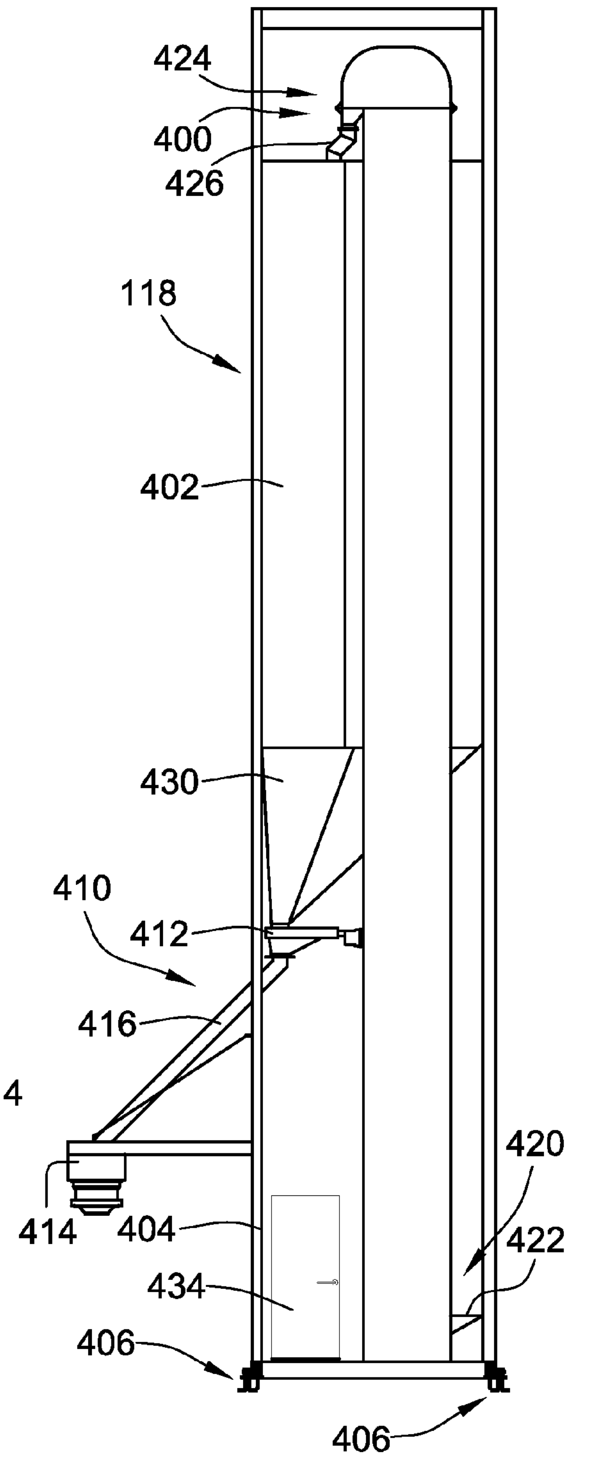
Figure 12:
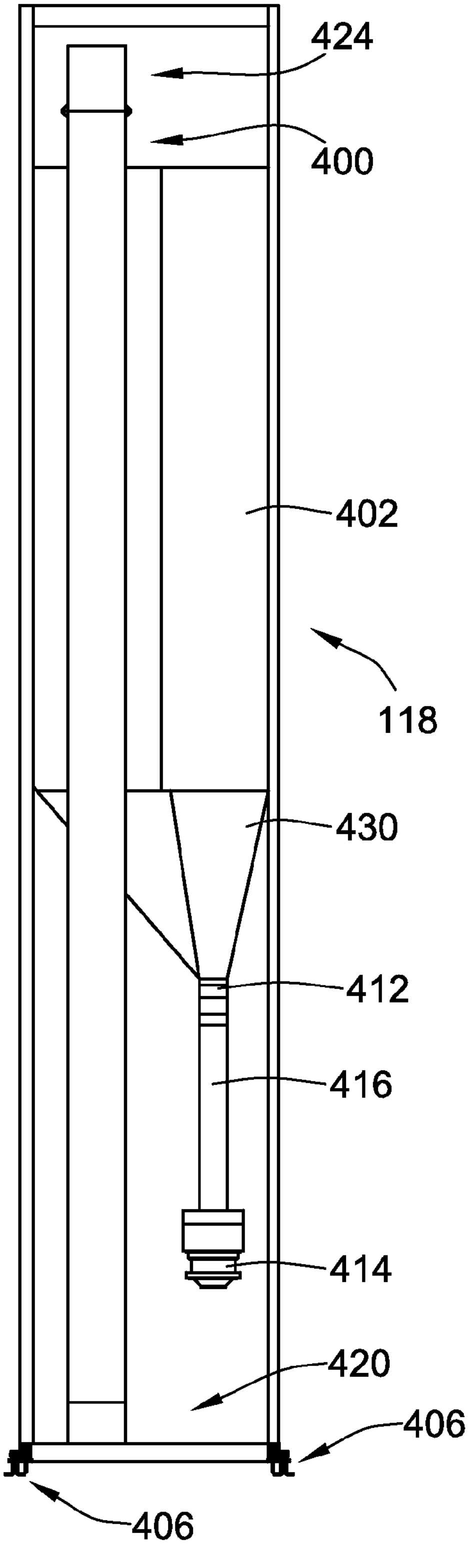
Figure 13:
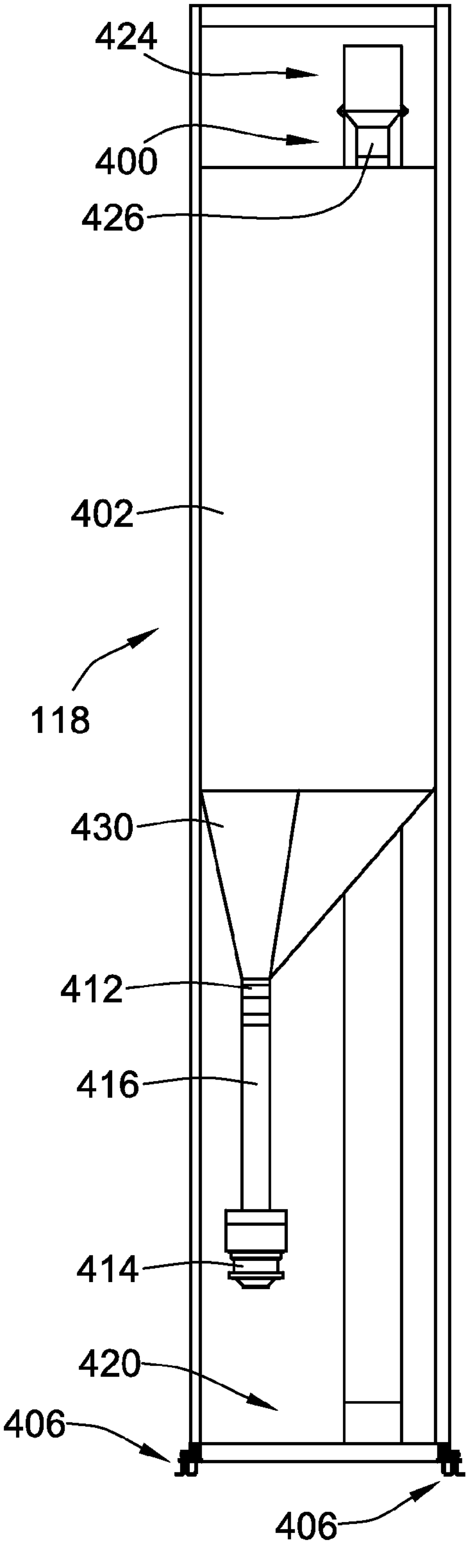
Figure 14:
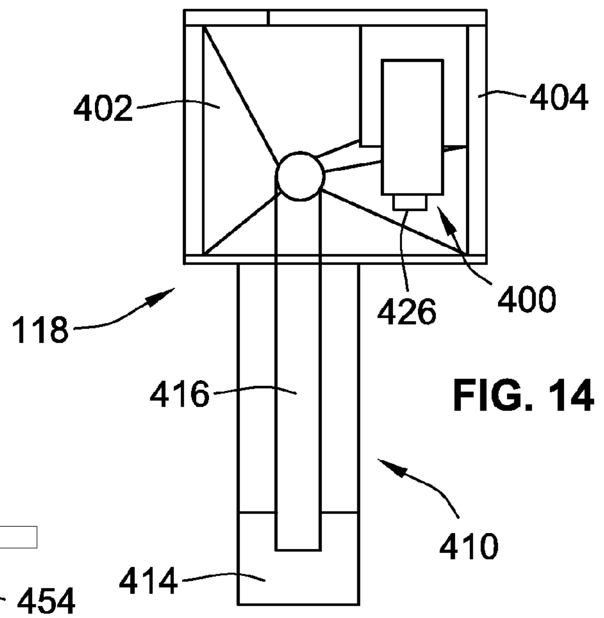

While intermodal shipping containers may be used to provide the self-supporting independent frame structures described above, the intermodal shipping containers may be modified to increase rigidity or provide the openings and access to the components as necessary. With reference to FIG. 8, various reinforcement members are added to the intermodal shipping containers to increase the structural rigidity and strength of the self-supporting independent frame structures.

In FIG. 8, the heavy solid lines represent the structural reinforcement members that are added to the general structural frame of the intermodal shipping container. During assembly of the screen towers 112, 114 additional structural members, such as diagonal members 300 may be also added to interconnect and provide additional structural support between adjacent or across the interface between adjacent portable processing modules. While these additional structural reinforcement members are shown as being added to an intermodal shipping container in FIG. 8, other self-supporting independent frame structure may be provided that are not initially formed from intermodal shipping containers but are formed directly for this type of system but that resemble intermodal shipping containers.

FIG. 8 also illustrates horizontal connectors 302 illustrated in the form of threaded bolts and nuts used to interconnect the elevator module 108 with the two upper portable processing modules in the form of first and second separation units 166, 168.

FIG. 8 further illustrates more detailed versions of connectors 230 used to vertically connect and laterally align adjacent portable processing modules 166, 168 170, 172.

Further, openings that are formed in any of the portable processing modules could be covered by tarps or removable closures, such as metal sheeting, for shipping purposes.

Other modules may also be added to a processing plant. For instance, a spacer module could be added that is generally used simply to vertically offset one portable processing module from another portable processing module. These spacer modules may not have any actual processing equipment included therewith but are substantially only formed from a self-supporting independent frame structure. These spacer modules can be used, for example, to increase the pitch of a chute so as to improve gravity flow of the processed product. In some instances, the spacer modules may merely be used to raise another module so that other equipment such as trucks can pass underneath a particular piece of processing equipment. For instance, a module used to load trucks may be rested on top of a spacer module so as to allow the truck to pass under a loading belt or chute. Other modules that do not include any processing equipment could be provided for imbedded storage of ware parts, maintenance and repair materials, laboratories, offices, safety equipment, etc.

In some embodiments, portions of the dust collection system and components are affixed to the self-supporting independent frame structures of the various portable modules and remain affixed thereto during assembly, disassembly and transport. The electrical wiring for the dust reduction system can also be provided by the electrical system that extends through the elevator module 108 as discussed above.

FIGS. 9-14 illustrate the bulk-load out module 118, one form of a portable processing module, in more detail. The bulk-load out module 118 in the illustrated embodiment is formed from a fifty-three foot long intermodal shipping container turned on end.

The bulk-load out module 118 will include processing components in the form of a bucket elevator 400 and hopper 402 that are supported by the self-supporting independent frame structure 404 of the bulk-load out module 118. The self-supporting independent frame structure 404 has generally rectangular sides, ends and top and bottom such that the self-supporting independent frame structure 404 is generally a rectangular, right, prism. The self-supporting independent frame structure 404 would typically be secured to a concrete slab to prevent movement thereof during operation. This may be done by bolting or using connectors 406. The connectors could also be used to secure the bulk-load module 118 to a trailer or other transportation device for transporting the bulk-load module 118.

The bucket elevator 400 and hopper 402 are affixed to the self-supporting independent frame structure 404 such that they remain affixed thereto during both operation of the bulk-load out module 118 as well during transport. Again, additional bracketing and bracing may be added to the self-supporting independent frame structure 404 to help support the weight of processing components.

The bulk-load out module 118 includes a metering assembly 410 for controlling the flow of product from the hopper 402. The metering assembly 410 includes a slide gate 412, a loading spout 414 and a chute 416 connecting the loading spout 414 to the slide gate 412. Flow of product can be metered using the slide gate 412 as well as loading spout 414.

The chute 416 and loading spout 414 are, at least in part, external to the periphery defined by the self-supporting independent frame structure 404. As such, these components will typically be removable components that can be stored within the bulk-load out module 118 during transportation to and from a worksite.

The bulk-load out module 118 receives product processed by the screen towers 112, 114 from bi-directional conveyor module 116 and then bulk fills trucks for distribution of the bulk product. The bucket elevator 400 includes an inlet end 420 that includes an inlet trough 422 where product is supplied to the bucket elevator 400, operably, from the bi-directional conveyor module 116. An opening through the outer periphery of the self-supporting independent frame structure 404 provides access to the trough 422.

At a top outlet end 424, the bucket elevator 400 has a chute 426 that dumps into hopper 402.

The hopper 402 is generally L-shaped such that it wraps around two sides of the bucket elevator 400. A bottom end 430 of the hopper 402 has a tapered region 430 that directs the product towards the metering assembly 410 and particularly slide gate 412 and chute 416.

The bulk-load out module 118 includes a personnel access door 434 to permit access by workers to the elevator 400 and components of the hopper 402 and metering assembly 410. At an opposite end, a second access door 436 is provided for access proximate the top end of the bucket elevator 400.

A ladder or other climbing device may be provided internal to the self-supporting independent frame structure 404 to allow workers to get to the top of the bucket elevator 400.

Figure 15:
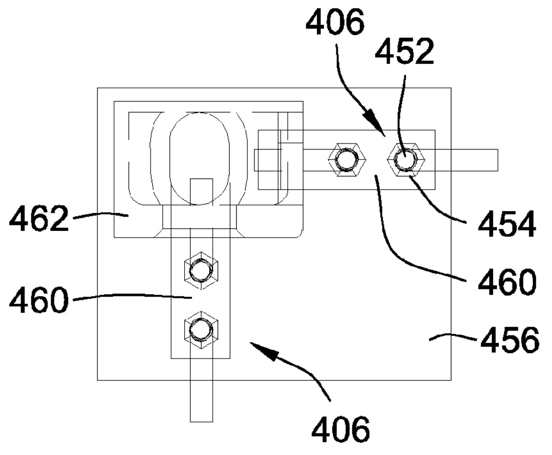
FIGS. 15-17 are simplified connector arrangements for securing the self-supporting independent frame structure of a portable processing module of the processing center of FIG. 1 during operation.
Figure 16:
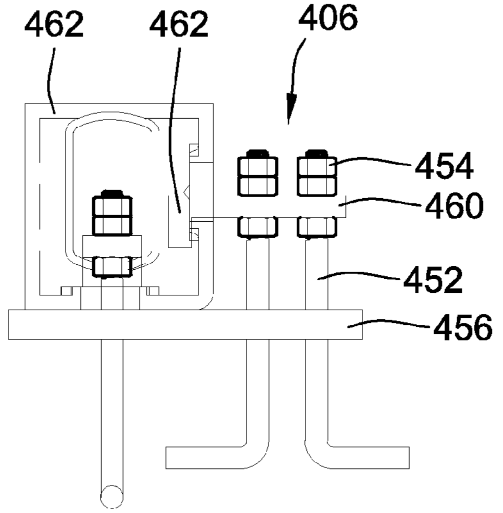
Figure 17:
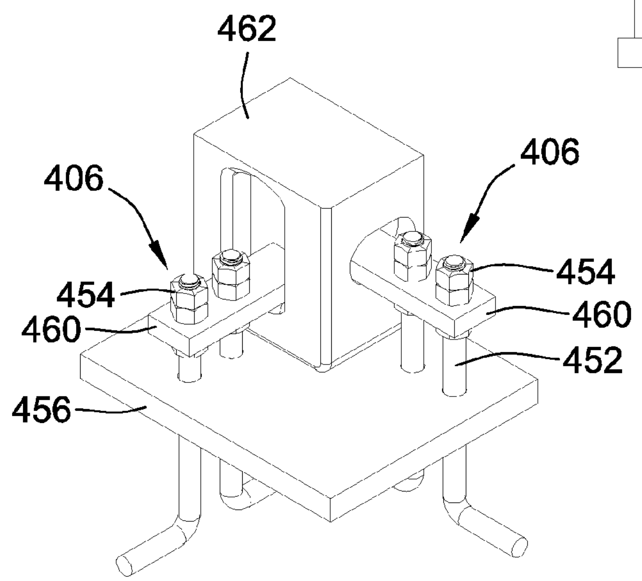

Connectors 406 are better illustrated in FIGS. 15-17. Connectors 406 include J- or L-bolts 450 that are typically submersed in a concrete slab. Free ends 452 extend out of the concrete slab and are threaded for receipt of nuts 454. The bolts 450 extend through base support plate 456 which helps align the bolts 450 when being inserted into the flowable concrete as well as provides a pad upon which the self-supporting independent frame structure 404 can rest after final assembly.

Hook plates 460 are attached to the free ends 452 of the bolts 450 and extend into corresponding openings in connection portions 463 of the self-supporting independent frame structure 404. The hook plates 460 include a hooked end 462 to help stabilize the self-supporting independent frame structure 404 when in an operating and assembled state.

All references, including publications, patent applications, and patents cited herein are hereby incorporated by reference to the same extent as if each reference were individually and specifically indicated to be incorporated by reference and were set forth in its entirety herein.

The use of the terms “a” and “an” and “the” and similar referents in the context of describing the invention (especially in the context of the following claims) is to be construed to cover both the singular and the plural, unless otherwise indicated herein or clearly contradicted by context. The terms “comprising,” “having,” “including,” and “containing” are to be construed as open-ended terms (i.e., meaning “including, but not limited to,”) unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A portable processing plant for processing a flow of granular material comprising:

a plurality of portable processing modules configured to be stacked vertically to allow for a vertically downward progression of the flow of granular material from one portable processing module to the next, each portable processing module including a self-supporting independent frame structure, each portable processing module having at least one processing component affixed to the self-supporting independent frame structure;

the self-supporting independent frame structures of the plurality of portable processing modules combining to define a structural skeleton of the portable processing plant, wherein each self-supporting independent frame structure is removable from the structural skeleton substantially fully assembled while the at least one processing component carried by the self-supporting independent frame structure remains affixed thereto;

wherein the plurality of portable processing modules includes:

a first separation unit including a processing component in the form of at least one separation mechanism for separating the flow of granular material into at least a first separated flow of granular material and a second separated flow of granular material, the second separated flow of granular material having a different characteristic than the first separated flow of granular material;

a second separation unit including a processing component in the form of at least one separation mechanism for separating the flow of granular material into at least a third separated flow of granular material and a fourth separated flow of granular material, the third and fourth flows of granular material having a different characteristic than the first and second separated flows of granular material;

a hopper unit including a processing component in the form of first, second, third, and fourth hoppers for holding granular material;

the first separation unit being vertically above and supported by the second separation unit, the first and second separation units being vertically above and supported by the hopper unit, when the structural skeleton is assembled and formed by the self-supporting independent frame structures of the first and second separation units and the hopper unit.

2. The portable processing plant of claim 1, wherein each portable processing module is configured to be mounted to a trailer with the processing component affixed to the self-supporting independent frame structure.

3. The portable processing plant of claim 1, wherein each self-supporting independent frame structure is formed from an intermodal freight container.

4. The portable processing plant of claim 1, wherein the plurality of portable processing modules further includes a hopper expansion unit, the hopper expansion unit including a processing component in the form at least one hopper extension portions that cooperates with at least one of the first, second, third or fourth hoppers to expand the capacity of the corresponding first, second, third or fourth hopper, the hopper expansion unit being positioned vertically below the first and second separation units and vertically above the hopper unit.

5. The portable processing plant of claim 1, wherein the weight of the plurality of portable processing modules is supported through the structural skeleton provided by the self-supporting independent frame structures.

6. The portable processing plant of claim 1, wherein the plurality of portable processing modules includes a first portable processing module including a first portion of a connection arrangement and wherein the plurality of portable processing modules includes a second portable processing module including a second portion of a connection arrangement configured to mate with the first portion of a connection arrangement when the first one of the plurality of portable processing modules is vertically placed on top of the second one of the plurality of portable processing modules.

7. The portable processing plant of claim 6, wherein the first and second portions of the connection arrangement inhibit horizontal movement between the first and second portable processing modules.

8. The portable processing plant of claim 1, further comprising:

a portable elevator module including:

a self-supporting independent frame structure defining an outer periphery;

a granular material elevator for transporting granular material affixed to the self-supporting independent frame structure within the outer periphery.

9. The portable processing plant of claim 8, further comprising a personnel climbing arrangement oriented with the elevator and affixed within the outer periphery.

10. The portable processing plant of claim 9, wherein, when assembled, the portable elevator module is positioned adjacent to the stack formed by the plurality of portable processing modules, the outer periphery of the portable elevator module having a plurality of openings sized for a person to pass therethrough and aligned with the plurality of the portable processing modules such that the person is able to pass from the portable elevator module into selected ones of the portable processing modules.

11. A method of forming a portable processing plant for processing a flow of granular material at an assembly location, the method comprising:

stacking a plurality of portable processing modules vertically to allow for a vertically downward progression of the granular material from one portable processing module to the next, each portable processing module including a self-supporting independent frame structure, each portable processing module having at least one processing component affixed to the self-supporting independent frame structure while stacking the plurality of portable processing modules;

when stacked, the self-supporting independent frame structures of the plurality of portable processing modules combine to define a structural skeleton of the portable processing plant, wherein each self-supporting independent frame structure is removable from the structural skeleton substantially fully assembled while the at least one processing component carried by the self-supporting independent frame structure remains affixed thereto;

wherein the plurality of portable processing modules includes:

a first separation unit including a processing component in the form of at least one separation mechanism for separating the flow of granular material into at least a first separated flow of granular material and a second separated flow of granular material, the second separated flow of granular material having a different characteristic than the first separated flow of granular material;

a second separation unit including a processing component in the form of at leak one separation mechanism for separating the flow of granular material into at least a third separated flow of granular material and a fourth separated flow of granular material, the third and fourth flows of granular material having a different characteristic than the first and second separated flows of granular material;

a hopper unit including a processing component in the form of first, second, third, and fourth hoppers for holding granular material;

the first separation unit being vertically above and supported by the second separation unit, the first and second separation units being vertically above and supported by the hopper unit, when the structural skeleton is assembled and formed by the self-supporting independent frame structures of the first and second separation units and the hopper unit; and providing a substantially permanent base pad; and wherein the step of stacking includes stacking the plurality of portable processing modules vertically on the base pad.

12. The method of claim 11, further comprising vertically fixing adjacently stacked portable processing modules to prevent adjacent portable processing modules from being vertically separated.

13. The method of claim 11, prior to the step of stacking, further comprising:

disassembling an assembled portable processing plant including at least one of the plurality of portable processing modules by removing the at least one of the plurality of portable processing modules from the assembled portable processing plant;

transporting the at least one of the plurality of portable processing modules from the assembled portable processing plant to the assembly location with the processing components affixed to the corresponding self-supporting independent frame structures.

14. The method of claim 11, further comprising transporting the plurality of portable processing modules to the location where the portable processing modules will be stacked with the processing components affixed to the corresponding self-supporting independent frame structure during transport.

15. The method of claim 14, wherein transporting includes transporting the portable processing modules on a trailer, the method further including removing the portable processing modules from the trailer with the corresponding processing components affixed to the corresponding self-supporting independent frame structure.

16. The method of claim 11, further comprising horizontally constraining adjacent portable processing modules while stacking to prevent horizontal motion between the adjacent portable processing modules.

17. The method of claim 16, wherein the plurality of portable processing modules includes a first portable processing module including a first portion of a connection arrangement and wherein the plurality of portable processing modules includes a second portable processing module including a second portion of a connection arrangement configured to mate with the first portion of a connection arrangement when the first one of the plurality of portable processing modules is vertically placed on top of the second one of the plurality of portable processing modules; and wherein horizontally constraining adjacent portable processing modules includes mating the first and second portions of the connection arrangement.

18. The method of claim 11, further comprising interconnecting at least two of the processing components by at least one removable material transfer device after the corresponding portable processing modules have been stacked vertically.

19. The method of claim 18, wherein the material transfer device extends across a boundary formed between two adjacent portable processing modules and extends into an interior of each of the portable processing modules defined by the self-supporting independent frame structures of the portable processing modules, the boundary defined by adjacent portions of the peripheries of the two adjacent portable processing modules.

* * * * *